Aug. 24, 1954

A. H. HAWES 2,687,268

ADJUSTABLE SHORE OR STRUT

Filed May 5, 1951

INVENTOR
Albert Henry Hawes
BY Lucke & Lucke
AGENTS

Aug. 24, 1954  A. H. HAWES  2,687,268
ADJUSTABLE SHORE OR STRUT
Filed May 5, 1951  3 Sheets-Sheet 2
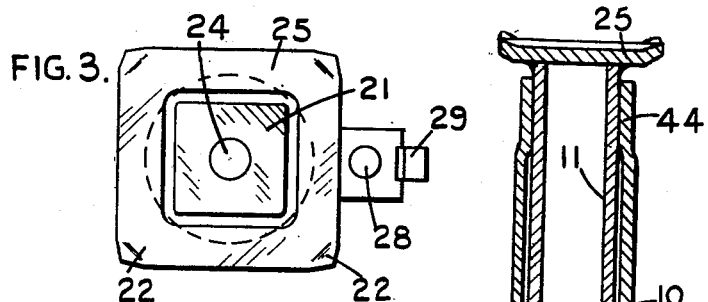
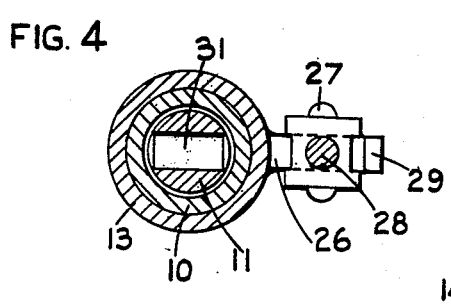
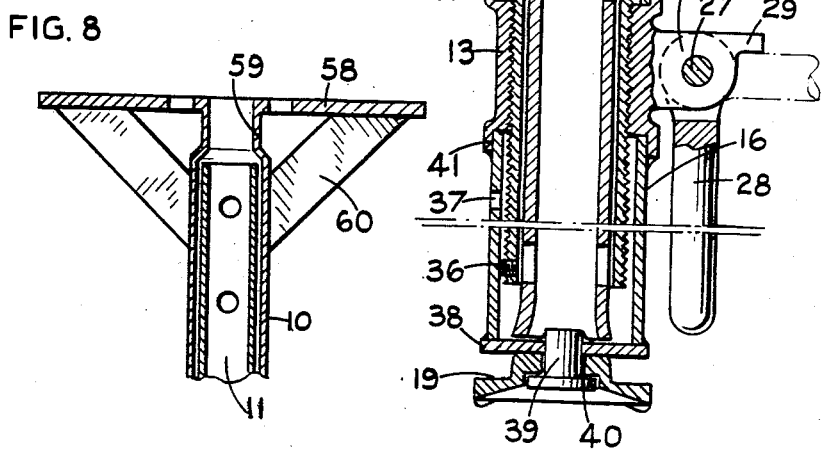
INVENTOR
Albert Henry Hawes
BY Lucke & Lucke
AGENTS Aug. 24, 1954  A. H. HAWES  2,687,268
ADJUSTABLE SHORE OR STRUT
Filed May 5, 1951  3 Sheets-Sheet 3

INVENTOR
Albert Henry Hawes
BY Lucke & Lucke
AGENTS

Patented Aug. 24, 1954

2,687,268

UNITED STATES PATENT OFFICE 2,687,268

ADJUSTABLE SHORE OR STRUT

Albert Henry Hawes, Erdington, Birmingham, England, assignor to Kwikform Limited, Birmingham, England, a British company Application May 5, 1951, Serial No. 224,793

Claims priority, application Great Britain May 8, 1950

6 Claims. (Cl. 248—354)

This invention relates to adjustable shores or struts, hereinafter referred to and included in the term "shores."

The invention has for its object the provision of an improved form of adjustable shore.

An adjustable shore according to the present invention comprises inner and outer shore members arranged telescopically one within the other, said outer shore member being of tubular form and having an external screwthread, a sleeve member having a nut portion rigid therewith, said nut portion being rotatably mounted on said outer shore member in operable engagement with said screwthread so as to be rotatable about the longitudinal axis of said shore, said sleeve member together with its associated nut portion having an overall axial length greater than the axial length of said outer shore member screwthread so as to enclose said screwthread completely in various axial positions of said nut portion in relation to said outer shore member, said screwthread having a helix angle sufficiently small as to preclude relative axial displacement of the sleeve member and the outer shore member under a force acting axially of the shore, one end of said sleeve member extending at one end of said shore beyond said outer shore member, said end of said sleeve member being provided with an annular bearing face directed axially of said shore in a direction away from said outer shore member, a thrust plate rotatably mounted on said end of said sleeve member and in rotatable annular engagement with said annular bearing face, one of said shore members having a plurality of diametrically extending holes therein, said holes being spaced apart axially of said shore, the other shore member having a hole extending diametrically therethrough, a pin adapted releasably to extend diametrically through any one of said axially spaced holes in said one shore member and to further extend within the hole in said other shore member, each of said holes in said shore members having axially directed faces adapted to transmit axially directed thrust to said pin, a thrust member on the end of said inner shore member most remote from said thrust plate, said sleeve member and said outer shore member being adapted to transmit axially directed thrust therebetween solely through the interengaging screwthreads of said nut portion and said outer shore member, said pin being adapted to transmit axially directed thrust between said inner and outer shore members solely by its engagement within the respective holes of these members, said sleeve member having its end remote from said thrust plate spaced axially of said pin, and means for rotating said nut portion around said outer shore member.

By the expression "axially directed" as used in the specification and claims is meant "in a direction parallel or substantially parallel to the central longitudinal axis of the shore."

Referring to the drawings:

Figure 3 is a plan view of the same construction.

Figure 4 is a sectional view on the line 4—4 of Figure 2.

Figure 5 is a cross sectional view showing a modified form of shore embodying the present invention.

Figure 8 is a cross sectional view of a detail showing an alternative form of thrust member for use in the construction depicted in Figure 7.

Figure 1:
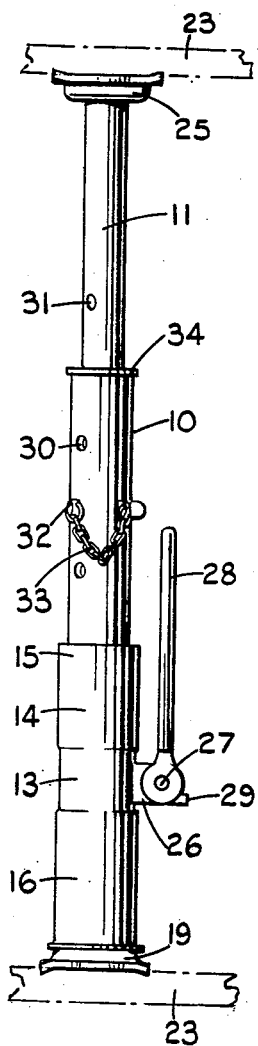
Figure 1 is a side elevation of one form of adjustable shore embodying the present invention.

Referring firstly to Figures 1 to 4 of the drawings, the invention is depicted as applied to a shore primarily intended for use in shoring up buildings including parts of building scaffolding, although the shore may be utilised for shoring up the sides of earth trenches if desired, and this shore comprises two shore members 10, 11 which are arranged telescopically with respect to one another, the member 10 being constructed in the form of a cylindrical tube, and the member 11 being adapted to slide within the tube 10 and being of solid cylindrical form throughout its length.

The tube 10 is provided externally over somewhat less than half its length adjacent one end thereof with a screwthread 12, and upon the threaded part of the tube is mounted a nut 13 in engagement therewith.

The screwthreads of both the tube and nut have a helix angle sufficiently small as to preclude relatively axial displacement of the nut and tube under a force acting axially of the shore, the screwthreads being in fact so formed as to permit of a fine adjustment of the length of the shore when the nut 13 is rotated around the tube 10.

The nut 13 forms part of a sleeve 14 which encloses and protects the screwthread 12 on the tube, the sleeve comprising upper and lower parts 15, 16 which are welded to opposite ends of the nut 13 in alignment therewith, and to the outer end of the sleeve part 16 is welded an end plate 17 formed centrally with an outwardly and axially projecting boss 18 on which is rotatably mounted a thrust member 19, the thrust member being of dished configuration and formed centrally in its base with a hole 20 through which the boss 18 rotatably projects, the boss being provided on its outer end with a retaining member 21 which may be welded to the boss to secure the thrust member 19 in position, and the latter is formed peripherally with a number of axially extending teeth 22 adapted to bite into any external deformable part, such as the ground or a timber member, as indicated at 23 in Figure 1, with which the thrust member 19 is adapted to engage.

The cylindrical part 11 of the shore which forms the other shore member is formed at its outer end with a boss 24 upon which a second thrust member 25 is mounted. This thrust member 25 is constructed similarly to the thrust member 19, but as shown in Figure 3, its dished interior is of square configuration, and the retaining member 21 on the boss 24 is in this case of square configuration of peripheral dimension somewhat less than the internal dimension of the square dished part of the thrust member 25, so that free relative rotation between the thrust member 25 and the shore member 11 is prevented, although a very limited relative turning movement between these parts can occur. Such limited relative movement facilitates the initial positioning of the thrust member 25 in engagement with its associated external part, but it is essential that free rotation between the thrust member 25 and the shore member 11 should not occur, otherwise when the shore was being extended under load and when the nut 13 was turned, under the axial pressure between the nut and the screwthreads 12, the nut 13 and tube 10 would rotate together with the shore member 11 about the thrust member 25.

Figure 2:
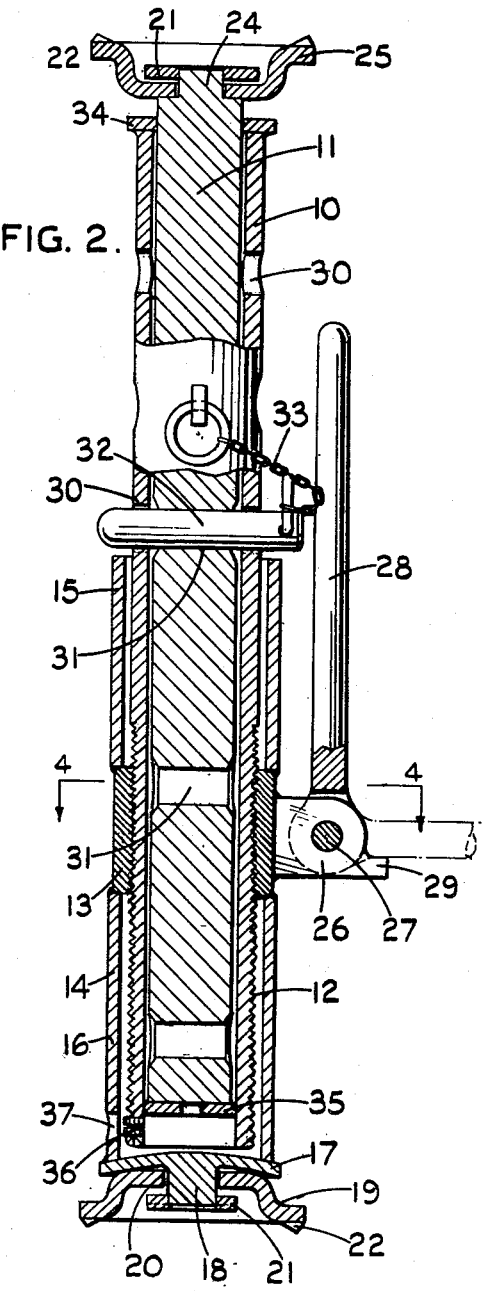
Figure 2 is a cross sectional view to an enlarged scale of the shore depicted in Figure 1.

The nut 13 is provided at one side with a laterally projecting lug 26 upon which is pivotally mounted at 27 the forked end of an operating handle 28, whereby the nut may readily be turned, the operating handle being adapted to be pivoted in relation to the lug 26 between an inoperative position in which it extends parallel to the length of the shore as shown in Figure 2 and an operative position in which it projects at right angles to the length of the shore as indicated in dotted outline in this figure, the operating handle being prevented from moving beyond this position by a projection 29 on the lug engaging with the adjacent side of the handle 28.

The tube 10 is formed at diametrically opposite sides with a number of axially spaced holes 30, while the member 11 is formed with further diametrically extending axially spaced holes 31, through which two sets of holes a pin 32 can be passed to secure the member 11 in a number of different axial positions in relation to the tube 10 so that the overall length of the shore can be roughly adjusted, fine adjustment being effected by turning the nut 13 around the tube 10.

The pin 32 is permanently secured to the tube 10 by a chain 33. Complete withdrawal of the member 11 from the tube 10 is prevented by making the member 11 of a diameter somewhat less than the internal diameter of the tube and welding to the end of the latter adjacent the thrust member 25 a ring 34 of internal diameter corresponding to the diameter of the member 11.

The inner end of the member 11 has secured thereto a cylindrical plate 35 of external diameter corresponding to the internal diameter of the tube 10 so that the outer periphery of this plate is adapted to engage with the inner periphery of the ring 34 to prevent complete withdrawal of the member 11 from the tube.

The inner end of the tube 10 carries a grub screw 36, the outer end of which is adapted to engage with the adjacent end of the nut 13 to prevent the nut from being screwed completely off the inner end of the tube, access to the grub screw being obtained through a hole 37 in the sleeve part 16.

In the modified construction shown in Figure 5, the shore member 11 is constructed in the form of a cylindrical tube instead of being of solid construction, and its associated thrust member 25 is constructed in the form of a metal plate which is welded to the outer end of the member 11 so as to be rigid therewith instead of having a limited relative rotational movement as in the preceding construction.

As is necessary to permit of rotation of the nut 13, the sleeve 14 is connected rotatably to its associated thrust member 19, but in this case the outer end of the sleeve carries a plain plate 38 formed centrally with a hole in which is welded a separate spigot 39, the outer end of which is headed at 40 to retain the thrust member 19 on the spigot and about which the thrust member 19 can rotate.

In this modified construction the nut 13 is recessed at 41 at each end thereof, the adjacent ends of the sleeve parts 15, 16 being secured within the nut recesses.

The inner end of the sleeve 14 is bent inwardly at 42 into engagement with the exterior of the tube 10 so as to provide a second bearing between the sleeve and the tube additional to that provided by the screwthread.

Further, in this modified construction complete withdrawal of the member 11 from the tube 10 is prevented by flaring outwardly the inner end of the member 11 as indicated at 43, and making the end of the tube 10 of reduced internal diameter adjacent the thrust member 25 as indicated at 44.

Otherwise the construction shown in Figure 5 is similar to the preceding construction.

Figure 6:
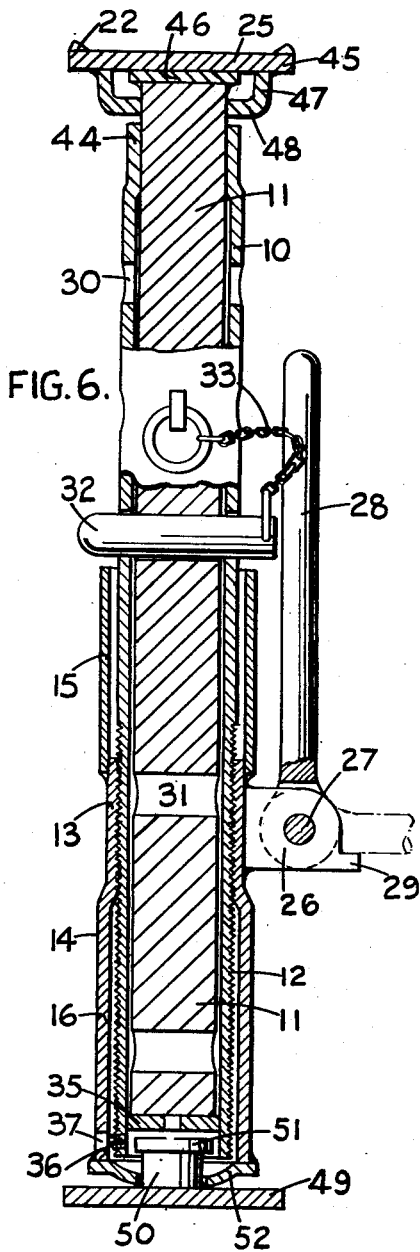
Figures 6 and 7 are cross sectional views showing two further modifications.

In the further modified construction illustrated in Figure 6, the shore member 11 is of solid form, as in the first described construction, and the nut 13 is formed integrally with the sleeve part 16 by making such part of reduced section at one end and threading internally the reduced section, while the sleeve part 15 is slipped over the extremity of the nut to which it is welded.

In this modified construction the thrust member 25 has a limited rotational movement relative to the shore member 11 in like manner to the first described construction, and the thrust member comprises a flat plate 45 formed with peripheral projections 22, the plate extending at right angles to the axis of the shore and having face to face contact on its inner side with a bearing plate 46 of square shape welded to the outer end of the shore member 11, the thrust member plate 45 being retained in position by welding its inner side to one end of a ring 47 of square configuration in cross section, which ring is inwardly flanged at 48 so as to be of a diameter less than the peripheral dimension of the plate 46 and to have rotatable engagement with the exterior of the adjacent member 11. The periphery of the square plate 46 engages with the square-shaped interior of the ring 47 so as to limit the relative rotational movement between the thrust member 25 and the shore member 11 in like manner to the construction first described.

The other thrust member 19 which is rotatably connected to the nut 13 is constructed in the form of a flat plate 49 extending at right angles to the shore axis, the inner side of the plate being welded centrally to an axially extending spigot 50, the inner end of which is headed at 51 so as to retain the spigot rotatably on a further annular plate 52 through which the spigot extends, which annular plate is welded to the outer end of the sleeve 14.

In this modified construction shown in Figure 6, the end of the tube 10 which is adjacent the thrust member 25 is of reduced section in like manner to the preceding construction and is adapted to engage with a plate 35 provided on the inner end of the member 11 in like manner to the first described construction, so as to prevent complete separation of the member 11 from the tube 10.

Figure 7:
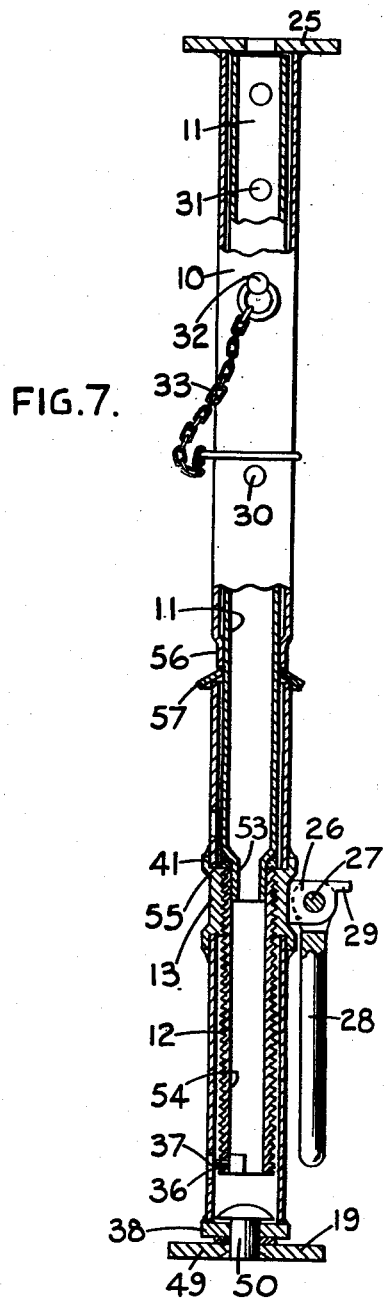

In the further modification depicted in Figure 7, instead of providing the screwthread 12 on the outer of the two relatively telescopic shore members, namely, on the tube 10, the screwthread is provided on the inner of such two members, namely, on the member 11, and the thrust member 25 is connected to the outer member, namely, the tube 10, instead of to the inner member 11.

In such modified construction the inner member 11 is formed as a cylindrical tube, the inner end of which is of reduced section as indicated at 53, and the screwthread 12 is provided on a separate tubular part 54, into one end of which the reduced part 53 extends, the two parts being welded together as shown at 55.

The nut 13 forms part of a sleeve generally similar to the construction depicted in Figure 5, and the thrust plate 19 is connected rotatably to the outer end of this sleeve in manner similar to the preceding construction, although in this case the spigot 50 is secured to the plate 49 by forming the latter with a hole through which the outer end of the spigot 50 extends, and in which hole the spigot may be welded.

The inner end of the tube 10 is of reduced section as indicated at 56 so as there to have sliding and thus guiding engagement with the exterior of the inner member 11, and to the extremity of this reduced part 56 is secured the inner periphery of a washer 57 of frusto-conical form, which washer is adapted to engage with the adjacent end of the sleeve 14, so as to prevent possible damage to the inner end of the sleeve and the inner end of the tube 10 by direct contact of these two ends when the shore is fully collapsed under load.

The thrust member 25 is constructed in the form of a flat plate which is welded to the tube 10. Otherwise the construction and mode of operation depicted in Figure 7 is similar to that of the preceding constructions.

In Figure 8 is depicted a form of thrust member alternative to that indicated at 25 in Figure 7, and which is connected rigidly to the outer end of the tube 10 of the construction depicted in Figure 7.

This thrust member comprises a flat plate 58 of peripheral dimension larger than that of the preceding construction, and secured both to the outer end of the tube 10 which is of reduced section as indicated at 59, and also by bracing plates 60 to the exterior of the tube 10.

With all of the above described constructions, it will be noted that the nut 13 is connected rotatably to one of the two thrust members of the shore, namely, to the thrust member 19, so that the nut can be turned freely while the thrust member 19 is in non-rotatable pressure contact with the external part with which it engages.

The present invention provides an adjustable shore of a particularly robust construction in which a coarse as well as a fine adjustment in the length of the shore can readily be effected, while in the particular arrangement described, the screwthread with which the nut engages is effectively protected by the sleeve 14 against dirt and atmospheric corrosion.

What I claim then is:

1. An adjustable shore comprising inner and outer shore members arranged telescopically one within the other, said outer shore member being of tubular form and having an external screwthread, a sleeve member having a nut portion rigid therewith, said nut portion being rotatably mounted on said outer shore member in operable engagement with said screwthread so as to be rotatable about the longitudinal axis of said shore, said sleeve member together with its associated nut portion having an overall axial length greater than the axial length of said outer shore member screwthread so as to enclose said screwthread completely in various axial positions of said nut portion in relation to said outer shore member, said screwthread having a helix angle sufficiently small as to preclude relative axial displacement of the sleeve member and the outer shore member under a force acting axially of the shore, one end of said sleeve member extending at one end of said shore beyond said outer shore member, said end of said sleeve member being provided with an annular bearing face directed axially of said shore in a direction away from said outer sleeve member, a thrust plate rotatably mounted on said end of said sleeve member and in rotatable annular engagement with said annular bearing face, one of said shore members having a plurality of diametrically extending holes therein, said holes being spaced apart axially of said shore, the other shore member having a hole extending diametrically threthrough, a pin adapted releasably to extend diametrically through any one of said axially spaced holes in said one shore member and to further extend within the hole in said other shore member, each of said holes in said shore members having axially directed faces adapted to transmit axially directed thrust to said pin, a thrust member on the end of said inner shore member most remote from said thrust plate, said sleeve member and said outer shore member being adapted to transmit axially directed thrust therebetween solely through the interengaging screwthreads of said nut portion and said outer shore member, said pin being adapted to transmit axially directed thrust between said inner and outer shore members solely by its engagement within the respective holes of these members, said sleeve member having its end remote from said thrust plate spaced axially of said pin, and means for rotating said nut portion around said outer shore member.

2. An adjustable shore comprising inner and outer shore members arranged telescopically one within the other, said outer shore member being of tubular form and having an external screwthread, a sleeve member having a nut portion rigid therewith, said nut portion being rotatably mounted on said outer shore member in operable engagement with said screwthread so as to be rotatable about the longitudinal axis of said shore, said sleeve member together with its associated nut portion enclosing said screw thread completely in various axial positions of said nut portion in relation to said outer shore member, said screwthread having a helix angle sufficiently small as to preclude relative axial displacement of the sleeve member and the outer shore member under a force acting axially of the shore, one end of said sleeve member extending at one end of said shore beyond said outer shore member, a bearing plate rigidly connected to said end of said sleeve member so as to extend across said end transversely of said shore, a thrust plate adapted to engage with the ground, roof or other external part, a spigot rigidly connected to one of said two plates and extending along the central longitudinal axis of said shore, said other plate having an opening therein, said spigot projecting through said opening, means on the projecting end of said spigot retaining said spigot within said opening, said two plates having interengaging oppositely axially directed annular bearing faces in rotatable engagement with one another, one of said shore members having a plurality of diametrically extending holes therein, said holes being spaced apart axially of said shore, the other shore member having a hole extending diametrically therethrough, a pin adapted releasably to extend diametrically through any one of said axially spaced holes in said one shore member and to further extend within the hole in said other shore member, each of said holes in said shore members having axially directed faces adapted to transmit axially directed thrust to said pin, a thrust member on the end of said inner shore member most remote from said thrust plate, said sleeve member and said outer shore member being adapted to transmit axially directed thrust therebetween solely through the interengaging screwthreads of said nut portion and said outer shore member, said pin being adapted to transmit axially directed thrust between said inner and outer shore members solely by its engagement within the respective holes of these members, said sleeve member having its end remote from said thrust plate spaced axially of said pin, and means for rotating said nut portion around said outer shore member.

3. An adjustable shore comprising inner and outer shore members arranged telescopically one within the other, said outer shore member being of tubular form and having an external screwthread, a sleeve member comprising a pair of axially spaced sleeves connected rigidly together through the medium of an intervening nut portion, said nut portion being rotatably mounted on said outer shore member in operable engagement with said screwthread so as to be rotatable about the longitudinal axis of said shore, said sleeve member including its associated nut portion enclosing said screwthread completely in various axial positions of said nut portion in relation to said outer shore member, said screwthread having a helix angle sufficiently small as to preclude relative axial displacement of the sleeve member and the outer shore member under a force acting axially of the shore, one end of said sleeve member extending at one end of said shore beyond said outer shore member, said sleeve member intermediate said end thereof and said nut portion having an internal bore greater than the internal diameter of said nut portion so that said sleeve member intermediate said end thereof and said nut portion is spaced from the periphery of the outer shore member therewithin, said end of said sleeve member being provided with an annular bearing face directed axially of said shore in a direction away from said outer shore member, a thrust plate rotatably mounted on said end of said sleeve member and in rotatable annular engagement with said annular bearing face, one of said shore members having a plurality of diametrically extending holes therein, said holes being spaced apart axially of said shore, the other shore member having a hole extending diametrically therethrough, a pin adapted releasably to extend diametrically through any one of said axially spaced holes in said one shore member and to further extend within the hole in said other shore member, each of said holes in said shore members having axially directed faces adapted to transmit axially directed thrust to said pin, a thrust member on the end of said inner shore member most remote from said thrust plate, said sleeve member and said outer shore member being adapted to transmit axially directed thrust therebetween solely through the interengaging screwthreads of said nut portion and said outer shore member, said pin being adapted to transmit axially directed thrust between said inner and outer shore members solely by its engagement within the respective holes of these members, said sleeve member having its end remote from said thrust plate spaced axially of said pin, and means for rotating said nut portion around said outer shore member.

4. An adjustable shore comprising inner and outer shore members arranged telescopically one within the other, said outer shore member being of tubular form and having an external screwthread extending from one end of said outer shore member to a position intermediate the end thereof, said screwthread having a root diameter less than the external diameter of said outer shore member, a sleeve member comprising a pair of axially spaced sleeves connected rigidly together through the medium of an intervening nut portion, said nut portion being rotatably mounted on said outer shore member in operable engagement with said screwthread so as to be rotatable about the longitudinal axis of said shore, said sleeve member including its associated nut portion enclosing said screwthread completely in various axial positions of said nut portion in relation to said outer shore member, said screwthread having a helix angle sufficiently small as to preclude relative axial displacement of the sleeve member and the outer shore member under a force acting axially of the shore, one end of said sleeve member extending at one end of said shore beyond said screwthreaded end of said outer shore member, said sleeve member intermediate said end thereof and said nut portion having an internal bore greater than the internal diameter of said nut portion so that said sleeve member intermediate said end thereof and said nut portion is spaced from the periphery of the outer shore member therewithin, a radially directed screw mounted removably within the externally screwthreaded end of said outer shore member, the outer end of said screw projecting above the periphery of said outer shore member but being spaced from the interior of the adjacent sleeve member between said sleeve member end and said nut portion, said sleeve member between said nut portion and said sleeve member end having a hole for the removable passage of said screw, said end of said sleeve member being provided with an annular bearing face directed axially of said shore in a direction away from said outer shore member, a thrust plate rotatably mounted on said end of said sleeve member and in rotatable annular engagement with said annular bearing face, one of said shore members having a plurality of diametrically extending holes therein, said holes being spaced apart axially of said shore, the other shore member having a hole extending diametrically therethrough, a pin adapted releasably to extend diametrically through any one of said axially spaced holes in said one shore member and to further extend within the hole in said other shore member, each of said holes in said shore members having axially directed faces adapted to transmit axially directed thrust to said pin, a thrust member on the end of said inner shore member most remote from said thrust plate, said sleeve member and said outer shore member being adapted to transmit axially directed thrust therebetween solely through the interengaging screwthreads of said nut portion and said outer shore member, said pin being adapted to transmit axially directed thrust between said inner and outer shore members solely by its engagement within the respective holes of these members, said sleeve member having its end remote from said thrust plate spaced axially of said pin, and means for rotating said nut portion around said outer shore member.

5. An adjustable shore comprising inner and outer shore members arranged telescopically one within the other, said outer shore member being of tubular form and having an external screwthread, a sleeve member having a nut portion rigid therewith, said nut portion being rotatably mounted on said outer shore member in operable engagement with said screwthread so as to be rotatable about the longitudinal axis of said shore, said sleeve member together with its associated nut portion enclosing said screwthread completely in various axial positions of said nut portion in relation to said outer shore member, said screwthread having a helix angle sufficiently small as to preclude relative axial displacement of the sleeve member and the outer shore member under a force acting axially of the shore, one end of said sleeve member extending at one end of said shore beyond said outer shore member, said end of said sleeve member being provided with an annular bearing face directed axially of said shore in a direction away from said outer shore member, a thrust plate rotatably mounted on said end of said sleeve member and in rotatable engagement with said annular bearing face, one of said shore members having a plurality of diametrically extending holes therein, said holes being spaced apart axially of said shore, the other shore member having a hole extending diametrically therethrough, a pin adapted releasably to extend diametrically through any one of said axially spaced holes in said one shore member and to further extend within the hole in said other shore member, each of said holes in said shore members having axially directed faces adapted to transmit axially directed thrust to said pin, a thrust member on the end of said inner shore member most remote from said thrust plate, one of said two last mentioned members having an apertured portion into which a part of said other member projects axially, said axially projecting part being of non-circular configuration peripherally and being adapted to engage within said aperture of said apertured portion so as to permit of said thrust member having limited rotation only about said shore axis relative to said inner shore member, said sleeve member and said outer shore member being adapted to transmit axially directed thrust therebetween solely through the interengaging screwthreads of said nut portion and said outer shore member, said pin being adapted to transmit axially directed thrust between said inner and outer shore members solely by its engagement within the respective holes of these members, said sleeve member having its end remote from said thrust plate spaced axially of said pin, and means for rotating said nut portion around said outer shore member.

6. A shore according to claim 5 wherein said inner shore member is formed at the end thereof adjacent to said thrust member with an axially directed portion of square form in cross section and said thrust member is provided with an apertured portion, the aperture of which is also of square configuration but of size slightly larger than the peripheral cross section of said shore member projecting portion.

References Cited in the file of this patent

UNITED STATES PATENTS

| Number | Name | Date |
|---|---|---|
| 891,897 | Astrom | June 30, 1908 |
| 1,381,663 | Roeder | June 14, 1921 |
| 1,485,572 | Stoltz | Mar. 4, 1924 |
| 1,719,528 | Beckley et al. | July 2, 1929 |
| 2,468,484 | Clark | Apr. 26, 1949 |

FOREIGN PATENTS

| Number | Country | Date |
|---|---|---|
| 500,085 | Great Britain | Feb. 2, 1939 |